United States Patent

[11] 3,599,474

[72] Inventors Ronald E. Brown
 Altadena;
 David R. Garfinkle, Sherman Oaks, both of, Calif.
[21] Appl. No. 844,785
[22] Filed July 25, 1969
[45] Patented Aug. 17, 1971
[73] Assignee Whittaker Corporation

[54] SELF-CALIBRATING HEAT FLUX TRANSDUCER
 5 Claims, 2 Drawing Figs.
[52] U.S. Cl. ................................................ 73/1 F,
 73/341, 73/DIG. 7, 136/233
[51] Int. Cl. .................................................. G01k 7/02,
 G01k 19/00
[50] Field of Search ...................................... 73/1 F, 15,
 190, 190 HF, 340 HF, 341

[56] References Cited
 UNITED STATES PATENTS
 3,045,473 7/1962 Hager ............................ 73/15 (Cond)
 3,238,775 3/1966 Watts ............................ 73/190 HF
 3,260,102 7/1966 Werner ......................... 73/1 F Primary Examiner—Louis R. Prince
Assistant Examiner—Frederick Shoon
Attorney—Donald E. Nist ABSTRACT: A heat flux transducer comprises a body of low heat conductivity material within which is embedded at least one pair of differential thermocouples. A sheet of uniform thickness and of conductive material is disposed between such thermocouples and has electrical connections thereto for passage of current through such sheet for calibration of such transducer.

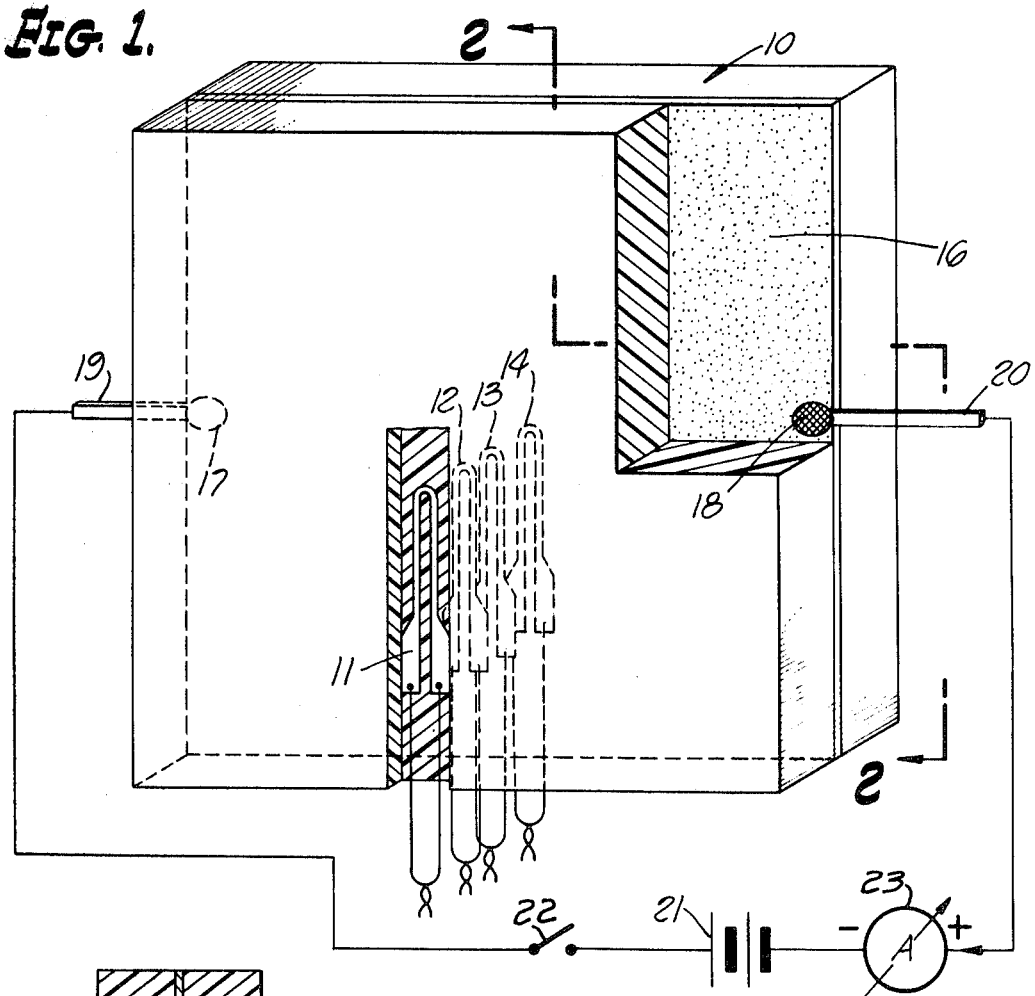
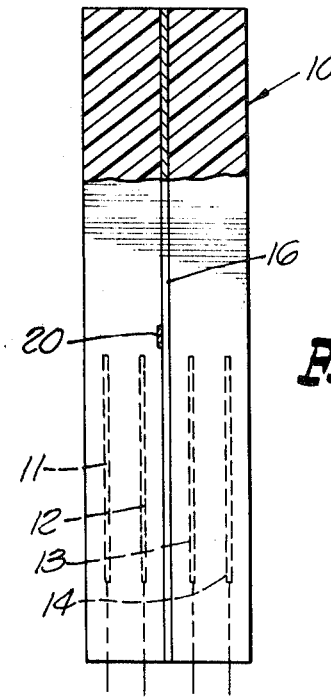

SELF-CALIBRATING HEAT FLUX TRANSDUCER

The present invention relates to improved means and techniques for measuring the intensity of heat flowing through a media, either gaseous, liquid or solid, involving the measurement of the difference in temperature in at least two planes which are spaced from each other along the direction of heat flow.

An object of the present invention is to provide means and techniques whereby a device using two spaced thermocouples for measuring heat flow incorporates means whereby the device is self-calibrating.

Another object of the present invention is to provide means and techniques of this character involving the use of a centrally embedded heating element between a pair of differential thermocouples which are used to measure the heat flux travelling through a plastic film in either direction, the centrally located heater being employed to generate known or calculated heat fluxes within the transducer so that the heat flux meter can be calibrated simply, expeditiously and accurately.

Another object of the present invention is to provide means and techniques whereby a transducer of this character may be self-calibrating.

Another object of the present invention is to provide a transducer of this character which may be calibrated easily and expeditiously in terms of Joule heating in a resistance element interposed between thermocouples which, in normal use of the transducer, are spaced along the direction of the expectant heat flow.

Another object of the present invention is to provide a transducer of this character involving the use of a thermally stable plastic material such as a polyimide in which is embedded a vapor-deposited film of aluminum, such film of aluminum being interposed between a pair of thermocouples which are also embedded in the plastic material and the film of aluminum being used to develop heat for calibration of the transducer.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 illustrates in perspective and in sectional form a transducer embodying features of he present invention.

FIG. 2 is a sectional view through the same taken substantially as indicated by the lines 2–2 in FIG. 1.

As illustrated, the transducer is generally of rectangular shape and comprises generally a body of polyimide plastic which is thermally stable and useful in environment in which the temperature exceeds 600° C. Such plastic material desirably has a low thermoconductivity of, for example, $3.74 \times 10^{14}$ calories per centimeter second degree Centigrade at 25° C.

The thickness of the body or rectangular block 10 as illustrated may be in the order of 0.030 inch; however, this dimension is not critical since it may vary depending upon the sensitivity desired.

Embedded at distances of 0.005 inch from each other are four copper-constantan thermocouples. Each of these thermocouples 11, 12, 13 and 14 are 0.002 inch thick and thus have a very low thermal inertia with a consequent fast response time. Located in the center of this polyimide matrix 10 is a vapor-deposited film of aluminum 16. On two sides or edges of this film, as illustrated in FIG. 1, there are two low resistance copper-contacts 19, 20 intimately bonded at 17 and 18 by electroplating directly to the aluminum surface. This aluminum film is used as a heater.

It is noted that the film 16 is located between the thermocouples 12 and 13, i.e. the thermocouples 11 and 12 are located on one side of the conductive sheet and the other pair 13, 14 are on the other side of the conductive sheet 16.

The transducer, as illustrated, is intended to be mounted to measure heat flux which flows in a direction generally perpendicular to the plane of the conductive sheet. For that purpose, the matrix or body 10 may be suitably mounted in a gas, solid or liquid or in any other fashion in which the heat flow is expected to be in that particular direction, i.e. perpendicular to the plane of the copper or aluminum heating sheet.

The sensitivity of this heat flux transducer may be expressed in terms of the flux units per volt or e.m.f. A typical heat transducer may have the following sensitivities expressed in millivolts per calorie per square centimeter second, namely: a sensitivity of 1.35 between thermocouples 11—12, thermocouples 12—13 and thermocouples 13—14; a sensitivity of 2.70 between thermocouples 11—13 and 12—14; and a sensitivity of 4.05 between thermocouples 11 and 14.

The heat flux sensor so constructed is self-calibrated by connecting the heater foil to a constant source of voltage 21, in series with switch 22 and meter 23.

The power dissipated in the conductive foil is of course equal to the product of the current times the voltage. The flux equivalent of the transducer is obtained by adding the voltage of differential thermocouples 11 and 12 and 13–14 and dividing this sum by the electrical energy being dissipated in the foil. This may be stated mathematically as follows: Flux Equivalent $= [E_{11,12} + E_{13,14}]/E \cdot I \cdot K$ Where $E_{11,12}$ and $E_{13,14}$ are the voltages of the differential thermocouples 11,12 and 13,14 and $K$ is a constant which converts Joules to calories. Such calibration is best performed when the device is submerged in a constant temperature fluid bath as, for example, iced water.

While the particular embodiments of the present invention have been shown and described, it will be obvious to those skilled in the art that changes and modifications may be made without departing from the invention in its broader aspects, and, therefore, the aim in the appended claims is to cover all such changes and modifications as fall within the true spirit and scope of this invention.

We claim:

1. A heat flux transducer comprising a body of low heat conductive material, a thin uniform electrically conducting sheet within said material, means for passing an electrical heating current through said sheet, and at least one differential thermocouple transducer in said body opposite each of the two sides of said sheet.

2. A heat flux transducer of the character described comprising a body of low thermoconductivity, a pair of differential thermocouples within said body, a sheet of uniform thickness and of electrically conductive material between said thermocouples, and electrical connections to said sheet.

3. A heat flux transducer of the character described comprising a body of low thermal conductivity material, as sheet of electrically conductive material within said body, electrical terminals connected to said sheet, and a plurality of differential thermocouples in said body, each of said thermocouples being on opposite sides of said sheet and being spaced along a direction which extends perpendicular to the plane of said sheet.

4. A transducer as set forth in claim 1 in which said low thermal conductivity material is a polyimide plastic.

5. A transducer as set forth in claim 1 in which said differential thermocouple transducer opposite each of the two sides of said sheet constitutes a first pair of individual thermocouples on one side of said sheet and a second pair of said individual thermocouples on the other side of said sheet, the individual thermocouples of each pair being equally spaced from each other in a direction extending perpendicular to the plane of said sheet with the corresponding ones of the individual thermocouples in each pair being equally spaced from said sheet in said direction.